United States Patent
Watanabe et al.

(10) Patent No.: US 9,052,104 B2
(45) Date of Patent: Jun. 9, 2015

(54) LIGHTING DEVICE AND METHOD MANUFACTURING HOLDER OF LIGHTING DEVICE

(75) Inventors: Masashi Watanabe, Yamanashi-ken (JP); Takashi Akiyama, Saitama-ken (JP); Atsushi Tonosaki, Tokyo (JP); Takashi Shimura, Yamanashi-ken (JP); Ken Kobayashi, Yamanashi-ken (JP)

(73) Assignees: CITIZEN ELECTRONICS CO., LTD., Yamanashi-Ken (JP); CITIZEN HOLDINGS CO., LTD., Tokyo (JP)

( * ) Notice: Subject to any disclaimer, the term of this patent is extended or adjusted under 35 U.S.C. 154(b) by 16 days.

(21) Appl. No.: 13/978,770

(22) PCT Filed: Jan. 20, 2012

(86) PCT No.: PCT/JP2012/051248
§ 371 (c)(1),
(2), (4) Date: Jul. 9, 2013

(87) PCT Pub. No.: WO2012/099251
PCT Pub. Date: Jul. 26, 2012

(65) Prior Publication Data
US 2013/0294085 A1    Nov. 7, 2013

(30) Foreign Application Priority Data

Jan. 21, 2011    (JP) ................................. 2011-010416

(51) Int. Cl.
*F21V 29/00*    (2006.01)
*B29C 45/14*    (2006.01)
(Continued)

(52) U.S. Cl.
CPC ....... *F21V 29/2206* (2013.01); *B29C 45/14467* (2013.01); *F21V 19/0055* (2013.01);
(Continued)

(58) Field of Classification Search
CPC ... F21V 29/004; F21V 29/2293; F21V 29/02; F21Y 2101/02; F21K 9/00
USPC .......................................................... 362/294
See application file for complete search history.

(56) References Cited

U.S. PATENT DOCUMENTS

| 6,525,455 B1 | 2/2003 | Matsuba et al. |
| 2002/0195918 A1 | 12/2002 | Matsuba et al. |

(Continued)

FOREIGN PATENT DOCUMENTS

| JP | 2006-40727 | 2/2006 |
| JP | 2009-004130 | 1/2009 |

(Continued)

OTHER PUBLICATIONS

Extended European Search Report issued May 12, 2014 in corresponding European Patent Application No. 12737008.8.

(Continued)

*Primary Examiner* — Joseph L Williams
(74) *Attorney, Agent, or Firm* — Wenderoth, Lind & Ponack, L.L.P.

(57) ABSTRACT

A lighting device includes a light source that includes at least one LED element and a module including a substrate on which the light source is mounted, and a holder in which at least a part of the module is arranged and held. The holder includes a cylindrical portion that includes a stepped portion and a flange of a heat conductor extending from an outer peripheral edge of the stepped portion on which the substrate is arranged, and the holder includes an insulation layer that covers at least outer peripheral surface of the cylindrical portion.

17 Claims, 13 Drawing Sheets

12---Module
15---Holder
16---Insulation layer
18---Heat conductor
19---Cylindrical portion of heat conductor
20---Stepped portion of heat conductor
21---Flange of heat conductor
22---Light source
23---Substrate on that light source is mounted

(51) Int. Cl.
*F21V 19/00* (2006.01)
*F21K 99/00* (2010.01)
*F21Y 101/02* (2006.01)

(52) U.S. Cl.
CPC ........... *F21Y2101/02* (2013.01); *F21K 9/1375* (2013.01); *F21K 9/90* (2013.01); *F21V 29/713* (2015.01); *F21V 29/74* (2015.01); *F21V 29/773* (2015.01); *F21V 29/85* (2015.01); *F21V 29/89* (2015.01)

(56) References Cited

U.S. PATENT DOCUMENTS

2009/0175041 A1   7/2009   Yuen et al.

2010/0096992 A1   4/2010   Yamamoto et al.
2011/0101861 A1   5/2011   Yoo
2011/0181183 A1   7/2011   Yoo

FOREIGN PATENT DOCUMENTS

| | | |
|---|---|---|
| JP | 2010-010134 | 1/2010 |
| JP | 2010-062005 | 3/2010 |
| JP | 3160879 | 7/2010 |
| JP | 2010-231913 | 10/2010 |
| KR | 10-0961840 | 6/2010 |
| WO | 2008/146694 | 12/2008 |

OTHER PUBLICATIONS

International Search Report mailed Mar. 13, 2012 in International (PCT) Application No. PCT/JP2012/051248.

12···Module
15···Holder
16···Insulation layer
18···Heat conductor
19···Cylindrical portion of heat conductor 20···Stepped portion of heat conductor
21···Flange of heat conductor
22···Light source
23···Substrate on that light source is mounted (a)

(b)

LIGHTING DEVICE AND METHOD MANUFACTURING HOLDER OF LIGHTING DEVICE

TECHNICAL FIELD

The present invention relates to a lighting device including a light source that includes at least one light-emitting diode element (LED element), and a method manufacturing a holder that can be used for the lighting device.

BACKGROUND

Recently, filament lamps and fluorescent lamps have been replaced by a lighting device including an LED element of lower power consumption and less flicker. The lighting device may include a light source that includes the LED element, a module including drive circuit to drive the light source, and a holder in which the module is arranged (Patent Document 1). The holder supports the light source and is configured to be a heat sink to release heat generated in the LED element to an exterior. The holder can be made of a metallic material with high thermal conductivity, and it is known that the holder is generally provided by die casting with metallic material.

In a method of manufacturing the heat sink by die casting, the heat sink tends to be thick, and there is an inability to cast the holder thin. Accordingly, an amount of metallic material used to cast the holder tends to increase and can be costly. Also, if a paint or coating to finish an exterior or to improve a heat radiation rate is applied to the holder, it also tends to be costly. Not only the die casting, but also press working, similarly tends to be costly.

Furthermore, it is possible to form the holder by molding resin material instead of metallic material. However, resin has lower thermal conductivity, and it is not possible to apply a large current to the LED element. Accordingly, it is not possible to adopt this holder to a lighting device with a high-intensity LED element, and it has been adopted in a limited way to a relatively small lighting device with a low-intensity LED element.

To improve the foregoing problems, it is disclosed that an LED lighting device includes a holder made of a metallic material and a resin material (Patent Document 2).

RELATED ART

Patent Documents

Patent Document 1: Japanese Unexamined Patent Application Publication No. 2009-4130.
Patent Document 1: Japanese Unexamined Patent Application Publication No. 2010-62005.

SUMMARY OF THE INVENTION

Problems to be Solved by the Invention

As mentioned above, in the lighting device of the structure including the holder made of metal as typified by Patent Document 1, the lighting device may have excellent heat conductivity, but may have increased weight, and thus, it may be difficult to handle. In addition, because a metallic surface of the holder is positioned outside, there might be a risk that the metallic surface becomes hot enough to cause a burn injury if it is accidentally touched.

On the other hand, in the holder made of a metallic material and a resin material as shown in Patent Document 2, the lighting device may be decreased in weight because the metallic portion is reduced. However, if the contact between a metallic surface and a resin surface is insufficient, heat conductivity effect might be reduced. To form a holder, it is generally known that after a metallic holder body, in that at least a part of the module is to be disposed, is formed by a die, a press work, for example, a resin material, might be blown on an outer side of the holder body. There may be cases in which the resin is excessively attached to an inner peripheral surface around an opening portion of the holder where the light source is disposed, or a part of the resin may remain as a burr. Excessively attached resin or a burr of resin may affect the heat-releasing operation or light-emitting operation.

Therefore, an object of the present invention is to provide a lighting device with decreased weight, another object is to provide a lighting device which is considered to be secure, and further object is to provide a lighting device including a structure to efficiently release heat that is to be generated in the LED element, and a method manufacturing a holder of a lighting device.

To Solve the Problems

A lighting device according to an aspect of the present invention includes a module including a substrate and a light source that includes at least one light-emitting diode element and that is mounted on the substrate, and a holder including a heat conductor that is thermally connected to the at least one light-emitting diode element of the light source and including an insulation layer.

The heat conductor includes a stepped portion to support the substrate of the module, and includes a flange that extends upward from an outer peripheral edge of the stepped portion, and the insulation layer covers at least an outer peripheral surface of the heat conductor. Furthermore, as an embodiment, the heat conductor includes an annular stepped portion provided on an upper portion of the holder, an annular flange that extends upward from an annular outer peripheral edge of the stepped portion, and a cylindrical portion that extends from an annular inner peripheral edge of the stepped portion downward under the substrate. The insulation layer covers at least outer peripheral surfaces of the annular stepped portion, the annular flange and the cylindrical portion of the heat conductor. To secure an insulation effect in a vicinity of the light source, the insulation layer may be integrated with the outer peripheral surface of the heat conductor and may extend from the outer peripheral surface of the heat conductor, passing over an upper portion of the annular flange, and extend to an inner peripheral surface of the flange. Furthermore, as another embodiment, it is possible to arrange a drive circuit including a substrate for the drive circuit and configured to drive the at least one LED element of the light source in a space inside the cylindrical portion of the heat conductor under the substrate on which the light source of the module is mounted.

A manufacturing method of a holder that can be used for a lighting device according to the present invention includes disposing a heat conductor including a stepped portion and a flange that extends upward from an peripheral edge of the stepped portion in a die, injecting a resin between an inner surface of the die and an outer peripheral surface of the heat conductor to form an insulation layer integrated on the outer peripheral surface of the heat conductor, and pressing the stepped portion of the heat conductor against the die by an injection pressure when injecting the resin between the inner surface of the die and the outer peripheral surface of the heat conductor. In addition, when injecting the resin, by changing an injection pressure, it is also possible to form an insulation layer on an upper portion of the flange and also on at least one part of an inner side of the flange, in addition to the outer peripheral surface of the heat conductor.

Effects of the Invention

According to an aspect of a lighting device of the present invention, it is possible to secure an insulating effect sufficiently at an outer surface of the lighting device, because the heat conductor included in the holder includes a stepped portion on which the substrate including the light source is mounted, and includes a flange extending upward from an outer peripheral edge of the stepped portion, and at least the outer peripheral surface of the heat conductor including the flange is covered with the insulation layer. In addition, heat generated in the LED element of the light source when the LED element is driven to emit light can be released through a portion of the heat conductor to an exterior effectively because the stepped portion on that the substrate is mounted and the flange are integrally made of a metal as the heat conductor, and the LED element included in the light source is thermally connected to the heat conductor.

In addition, it is possible that the insulation layer covering the outer peripheral surface of the heat conductor may extend from the outer peripheral surface of the heat conductor, pass over an upper portion of the flange and extend to an inner peripheral surface of the flange, covering the upper portion of the flange and at least a part of the inner peripheral surface of the flange. With this configuration, it is possible to enhance the insulating effect around the substrate on which the light source is mounted.

In addition, according to an aspect of a manufacturing method of the holder of the present invention, when injecting a resin in a die in which a heat conductor including a stepped portion and a flange is arranged, it is possible to prevent extra resin from excessively flowing around the flange by pressing the stepped portion of the heat conductor against the die by an injection pressure. Accordingly, it is possible to form an insulation layer uniformly on the outer peripheral surface of the heat conductor and to avoid a burr occurrence at the flange.

EMBODIMENTS ACCORDING TO THE INVENTION

Figure 1:
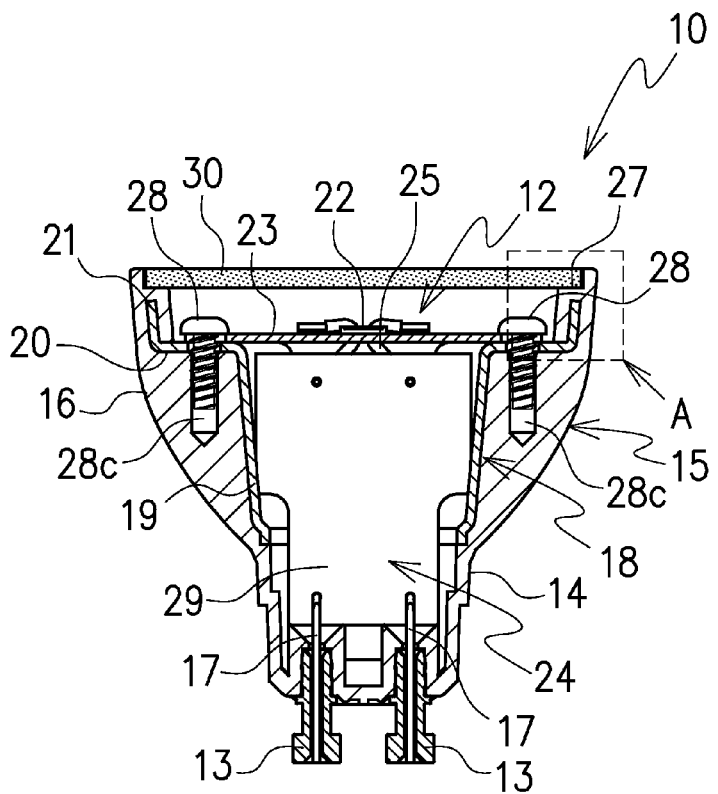
FIG. 1 is a sectional view of a lighting device according to a first embodiment of the present invention.
Figure 2:
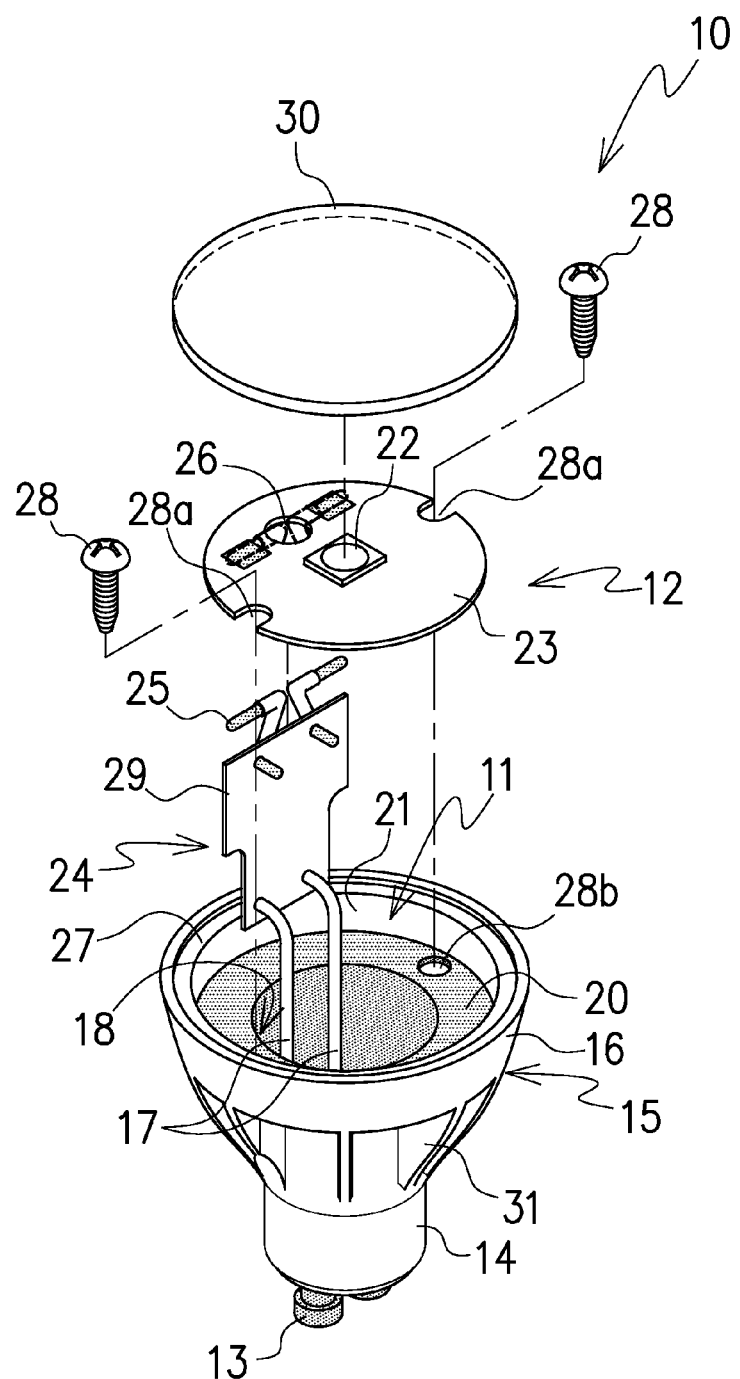
FIG. 2 is an exploded perspective view of the lighting device in the first embodiment.

Embodiments of a lighting device according to the present invention will be explained hereinafter in detail with reference to the accompanying drawings. FIGS. 1 and 2 show a structure of a lighting device 10 according to a first embodiment of the present invention. The lighting device 10 includes a module 12 including a light source 22 that is positioned at a main part of the module and that includes at least one light-emitting diode element (LED element), and includes a holder 15 having a space 11 in which at least a part of the module 12 is arranged. In addition, a base portion 14 is integrated with a lower end of the holder 15. This base portion 14 is configured to supply electricity from outside, can be formed by a resin molding to have a shape similar to a cap, and includes a pair of electrical contacts 13 that project from a bottom surface of the base portion. Although various configurations are considered to be available for the electrical contacts, they may include electrode terminals and so on.

The holder 15 includes a substrate 23 having an upper surface on which the light source 22 is mounted and having a lower surface, a heat conductor 18 supporting the lower surface of the substrate 23 at an upper portion of the holder 15, and an insulation layer 16 covering at least an outer peripheral surface of the heat conductor 18. The heat conductor 18 may be made of, for example, a metal such as aluminum, copper, phosphor bronze and so on, and configured to release heat generated in the light-emitting diode element of the light source 22 to an exterior. The insulation layer 16 may be a resin layer integrally formed with the outer peripheral surface of the heat conductor 18 by insert molding, for example. The heat conductor 18 is considered to be made of a thermally conductive material such as aluminum, iron, and brass, and may be made to include at least one of metal materials that include the above-mentioned metal materials. The heat conductor 18 includes an annular stepped portion 20 and a flange 21 in an upper portion of the holder 15, and a cylindrical portion 19 at a body portion that is a middle part of the holder 15. An upper end portion of the cylindrical portion 19 includes the annular stepped portion 20 that is provided around an opening of the space 11 inside the cylindrical portion 19, and the annular flange 21 rises substantially perpendicularly from an outer peripheral edge of the stepped portion 20.

Figure 3:
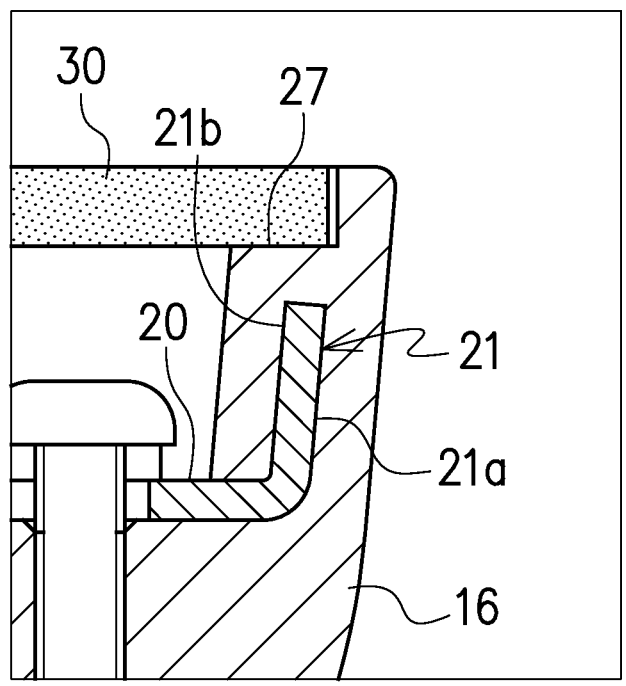
FIG. 3 is an enlarged view of portion A shown in FIG. 1.

The insulation layer 16 covering the outer peripheral surface of the heat conductor 18 is integrally formed with the base portion 14 that is provided at the lower end of the holder 15, and may cover a part of the stepped portion 20 as well as an inner peripheral surface of the flange 21 of the heat conductor 18, as shown in FIG. 3. The insulation layer 16 is made of a resin. The insulation layer may be formed by insert molding with thermoplastic resin such as PBT (polybutylene terephthalate resin), PPS (polyphenylene sulfide resin), PC (polycarbonate resin), PA (polyamide resin) and so on, or with heat-curable resin such as phenol resin, epoxy resin, and so on. The insulation layer 16 may be formed on at least the outer peripheral surface of the heat conductor 18. Polyphenylene sulphide resin or polycarbonate resin among the above-mentioned material may be appropriate to form the insulation layer 16. The insert molding with resin can form an insulation layer as a uniform coating on the outer peripheral surface of the heat conductor 18 in a short amount of time and is suitable for high-volume production.

Also, other than by the insert molding, it is possible to form the insulation layer 16 as multiple layer of resin material such as urethane, epoxy, and silicone on a surface of the heat conductor 18 by thick coating paint, for example. Because the die required for insert molding process is unnecessary for this thick coating paint, manufacturing process may be simpler and manufacturing cost may be less.

Figure 4:
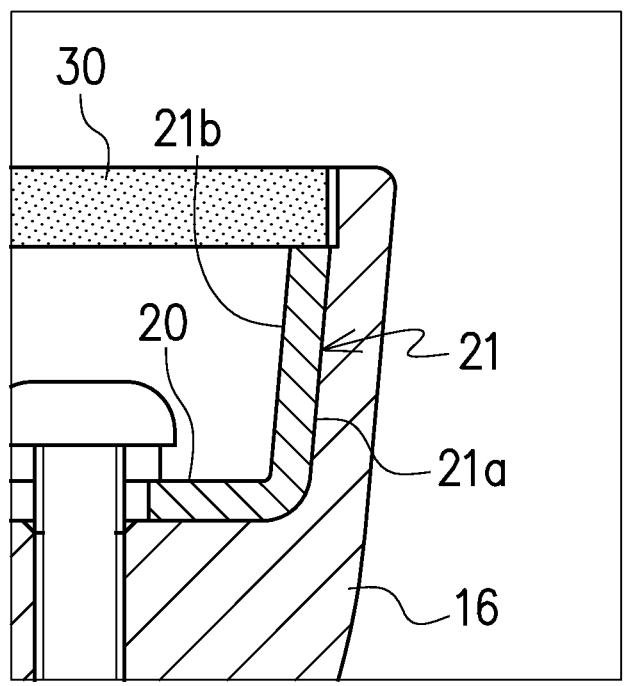
FIG. 4 is an enlarged view similar to FIG. 3, but shows a second coating variation of an insulation layer.
Figure 5:
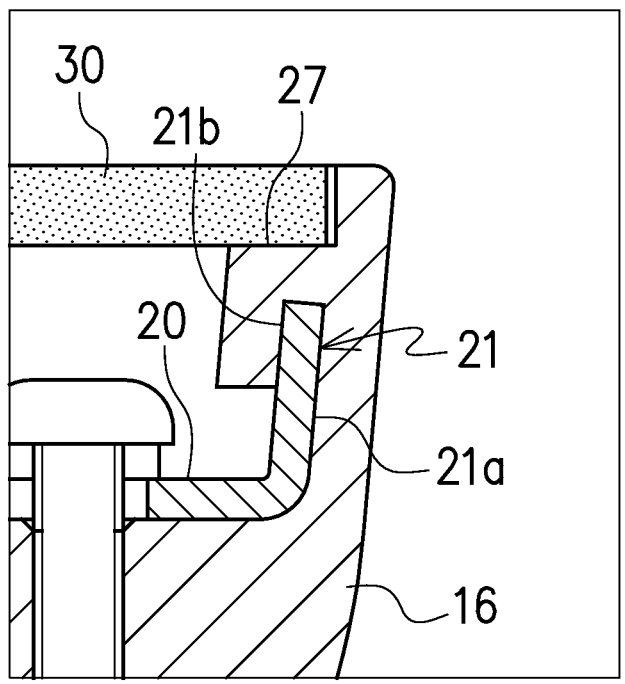
FIG. 5 is an enlarged view similar to FIG. 3, but shows a third coating variation of an insulation layer.

In the above mentioned embodiment, not only an outer peripheral surface 21a of the flange 21, but also the inner peripheral surface 21b of the flange 21 are entirely covered by the insulation layer 16 (see FIGS. 1 and 3) to improve voltage resistance of the heat conductor 18. Voltage resistance of the lighting device can be determined by an amount of electricity to be supplied to the LED element. Accordingly, if an amount of electricity to be supplied to the LED element is low, it may be sufficient to cover only the outer peripheral surface 21a by the insulation layer 16 as shown in FIG. 4 with the inner peripheral surface 21b of the flange 21 uncovered. Also, as shown in FIG. 5, it may be sufficient to cover the outer peripheral surface 21a and a part of the inner peripheral surface 21b of the flange 21. Even in a case shown in FIG. 4, since the insulation layer 16 covers the flange 21 to an upper end portion of the outer peripheral surface 21a, it is possible for a user to handle the lighting device safely without directly touching the heat conductor 18 made of a metal. In addition, as shown in FIGS. 3 and 5, since the insulation layer 16 extends from the outer peripheral surface of the heat conductor 18, passing over an upper portion of the flange 21, and extends to the inner peripheral surface 21b of the flange, the electromagnetic shield effect can be greater. Accordingly, sufficient insulating capacity can be achieved even if an LED element with high intensity and requiring high current is used.

Figure 7:
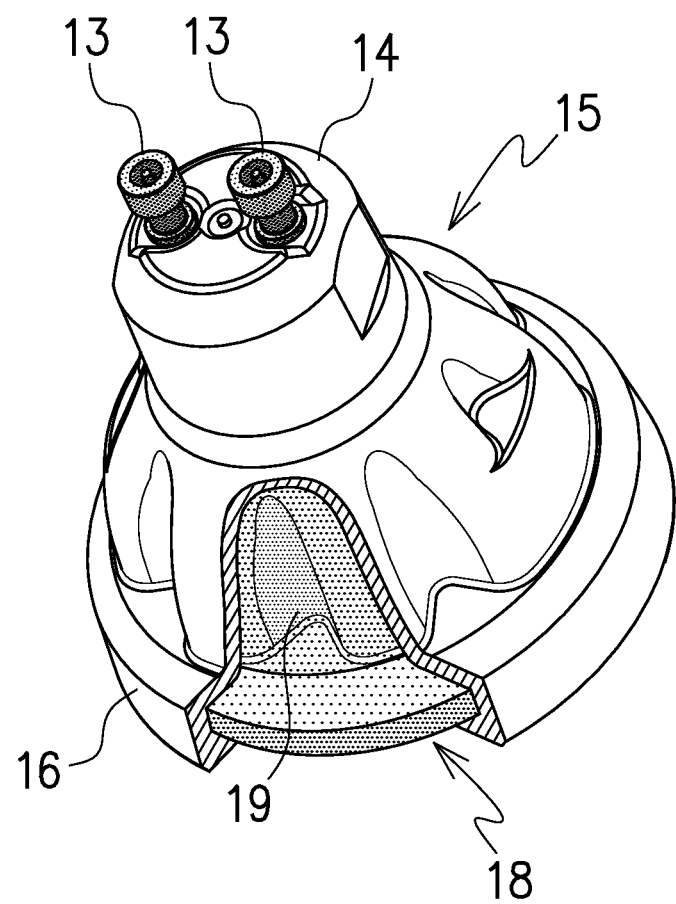
FIG. 7 is a perspective view of the lighting device from a side of the holder with an undulating surface.
Figure 8:
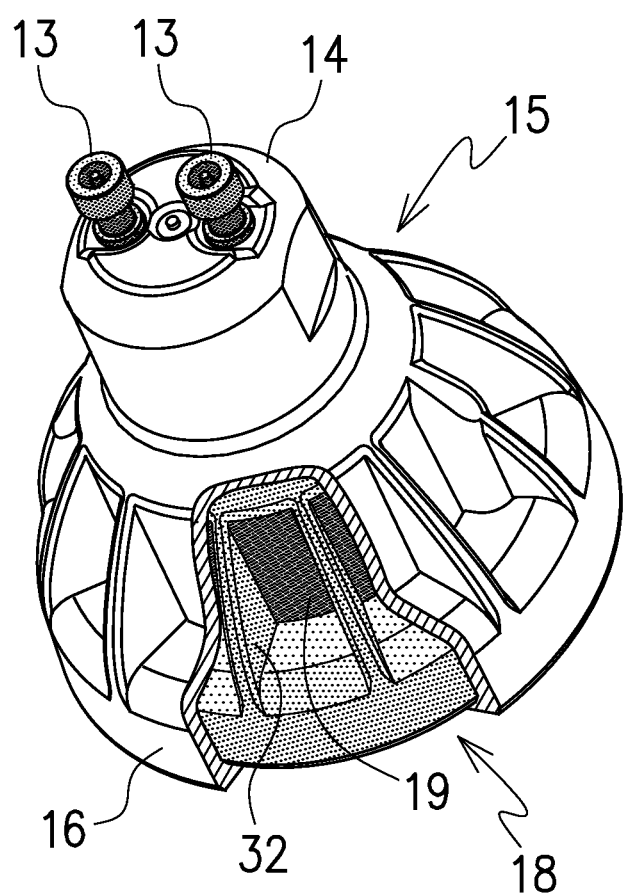
FIG. 8 is a perspective view of an LED lighting device from a side of a holder with heat-releasing fins.

The heat conductor 18 includes the cylindrical portion 19 that extends downward from an annular inner peripheral edge of the stepped portion 20. Fins 31 are provided with projection and concavity at an outer peripheral surface of the insulation layer 16 that covers an outer peripheral surface of the cylindrical portion 19. Also, as shown in FIG. 7, it is possible to provide an undulating surface on the cylindrical portion 19 of the heat conductor 18 to expand heat-releasing area efficiently. Furthermore, as shown in FIG. 8, it is possible to provide heat-releasing fins 32 that are made of a same material of the cylindrical portion 19 of the heat conductor 18 and integrated with the outer peripheral portion of the cylindrical portion 19 of the heat conductor 18 to increase an outer surface area of the cylindrical portion. A configuration of the undulating outer surface of the holder 15 may develop a design quality of the lighting device.

The holder 15 includes a body portion that includes a space inside the body portion, the space being demarcated by the cylindrical portion 19 of the heat conductor 18 extending from an inner peripheral edge of the stepped portion 20 downward under the substrate 23 of the module 12. As shown in FIG. 1 and FIG. 2, the module 12 includes the substrate 23 arranged on the stepped portion 20 that is annular and a flat portion of the heat conductor 18, the light source 22 mounted on the substrate 23, and a drive circuit 24 that is arranged in the space 11 in the body portion of the holder under the substrate 23. The base portion 14 is disposed at a lower end of the holder 15.

The substrate 23 on which the light source 22 is mounted may be a circular substrate made of epoxy resin, aluminum, BT resin and so on. An outer peripheral portion of the substrate is disposed on the stepped portion 20 of the heat conductor 18. The substrate 23 includes an electrode pattern (not shown) to mount the light source, and a hole 26 for electrical connection to the drive circuit 24 through lead wires 25. In addition, U-shaped notches 28a are provided in opposite ends of the substrate 23 that is to be fixed to the stepped portion 20 by oval head screws 28. The heat conductor 18 includes a pair of fixing holes 28b provided in the annular stepped portion 20 of the heat conductor 18 at positions corresponding to the U-shaped notches 28a. Also, the insulation layer 16 includes a pair of screw holes 28c provided in the insulation layer 16 to receive fixedly the oval head screws 28. It is possible to use a substrate having a different shape other than a circular shape, if the substrate can be mounted in a stable state on stepped portion 20 that is annular and flat.

The drive circuit 24 is arranged in the space 11 inside the cylindrical portion 19 of the heat conductor 18, and separately arranged from the substrate 23 on which the light source 22 is mounted, preferably to prevent parts other than the light source 22 from being disposed on the substrate 23. The drive circuit 24 is configured to drive the LED element of the light source 22 through the substrate 23 on which the light source 22 is mounted, and includes a board 29 for the drive circuit electrically connected through the lead wires 25 to the substrate 23 on which the light source 22 is mounted. A constant current element that can be mounted on the board 29 for the drive circuit, a protection element to protect against overcurrent, and a dimming control circuit may be provided, if necessary. The constant current element, the protection element and the dimming circuit are not shown in the figures. A pair of electrode pins 17 that are electrically connected to the electrical contacts 13 of the base portion 14 are provided at a lower portion of the board 29 for the drive circuit.

A lens 30 that can focus or diffuse light from the light source 22 is provided above the substrate 23 on which the light source 22 is mounted. The lens 30 has a circular shape slightly larger than the area of the substrate 23 and is fixed to an upper end of the holder 15 to cover the substrate 23 from above. Specifically, a lens holding portion 27 includes an annular stepped portion provided at an upper end of the insulation layer 16 that covers the flange 21 of the heat conductor 18. The lens 30 is fixed at an outer peripheral portion of the lens to the lens holding portion 27. In the embodiment shown in FIG. 4, the outer peripheral portion of the lens 30 is disposed at an upper end of the flange 21 that is positioned lower than the upper end of the insulation layer 16.

According to the lighting device 10 of this embodiment, because the heat conductor 18 made of a metal can conduct heat effectively and directly supports the circular substrate 23 at the stepped portion 20 of the heat conductor 18, it is possible to release heat generated from the LED element of the light source 22 mounted on the substrate 23 to the cylindrical portion 19 of the heat conductor 18 through the substrate 23 and the heat conductor 18. Also, it is possible to conduct heat directly to the entire of the heat conductor 18. Then, the heat from the light source 22 transferred to the heat conductor 18 may be released to an exterior through the insulation layer 16. Furthermore, as the outer surface of the holder 15 is entirely covered by the insulation layer 16, heat conductivity at the outer surface may be suppressed, and it is possible to prevent the build up of static charge or from suffering a burn injury even if the holder 15 is touched accidentally. Furthermore, compared with a lighting device with a holder 15 that is entirely made of metal material, the lighting device 10 can reduce weight as a whole, and, a risk of the device falling because of looseness of screws that may be caused by low frequency oscillation can be decreased.

Figure 6:
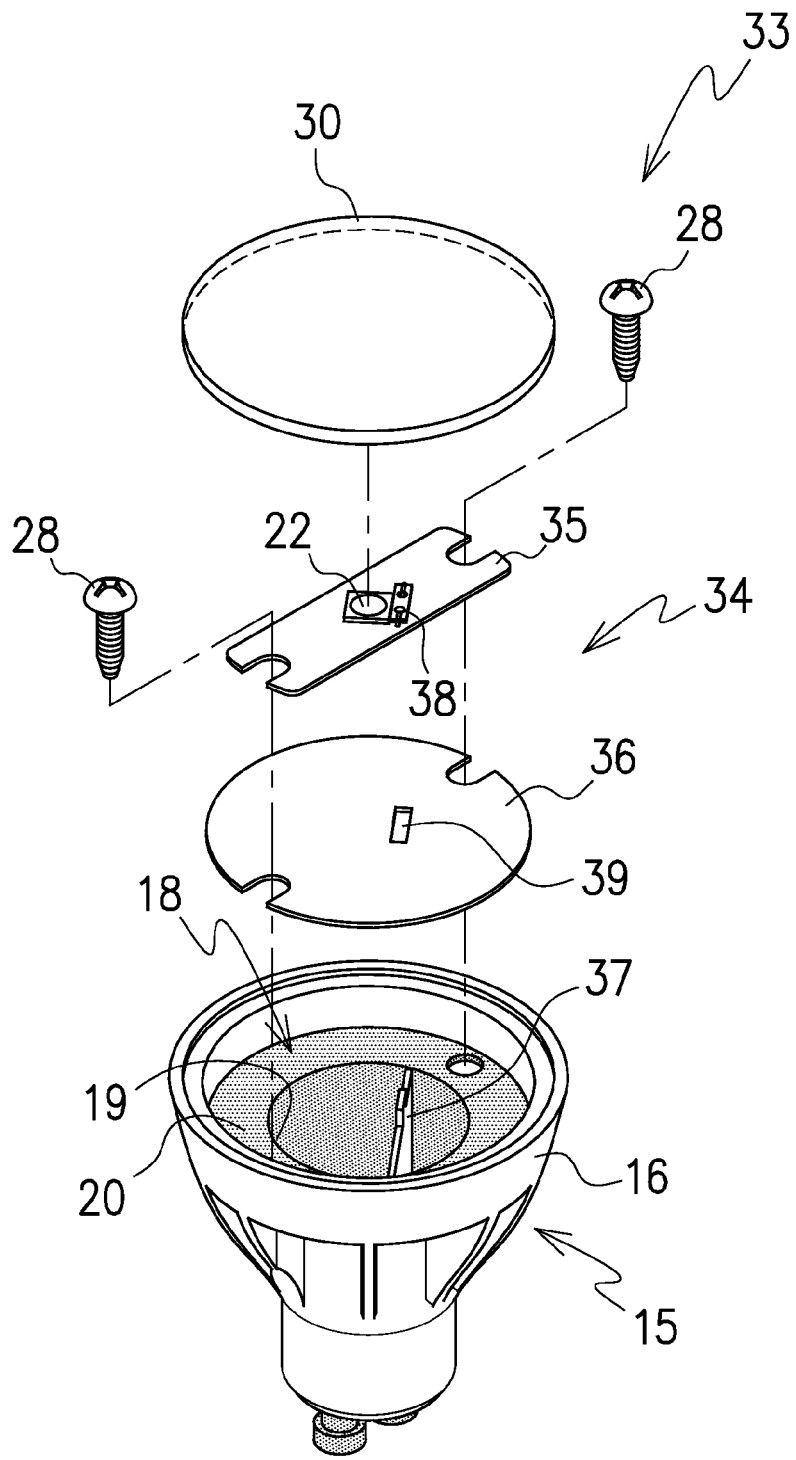
FIG. 6 is an exploded perspective view of a lighting device according to a second embodiment of the present invention.

FIG. 6 shows a lighting device 33 according to a second embodiment of the present invention. In this embodiment, a module 34 includes a strip-shaped substrate 35 on which the light source 22 is mounted, a circular heat-conducting plate 36 on which the substrate 35 is mounted, and a drive circuit 37 electrically connected to the substrate 35. If the substrate 35 secures a space to mount the light source 22, it can be reduced in size to be compact as a shape of strip, for example. In addition, the heat-conducting plate 36 is provided for assisting heat release from the substrate 35 which might be formed in a small size, and the heat-conducting plate may be made of aluminum having a high conductivity and formed in a size that the outer peripheral portion of the heat-conducting plate can be disposed on the stepped portion 20 of the heat conductor 18.

The substrate 35 is closely attached to the heat conducting plate 36, and the substrate 35 with the heat conducting plate 36 is fixed to the stepped portion 20 of the heat conductor 18 together by the oval head screws 28. Accordingly, heat generated from the LED element of the light source 22 when it is driven can be effectively conducted. In addition, at least a pair of connectors 38 are provided on a lower surface of the substrate 35 and are exposed by a hole 39 provided at a central portion of the heat-conducting plate 36. Thus, it is possible to electrically connect the pair of connectors 38 with the drive circuit 37 arranged in the cylindrical portion 19 of the heat conductor 18. Note that the insulation layer 16 covering the flange 21 of the heat conductor 18 can be formed similarly as that shown in FIGS. 3 to 5, and thus, further detailed description is omitted here.

Figure 9:
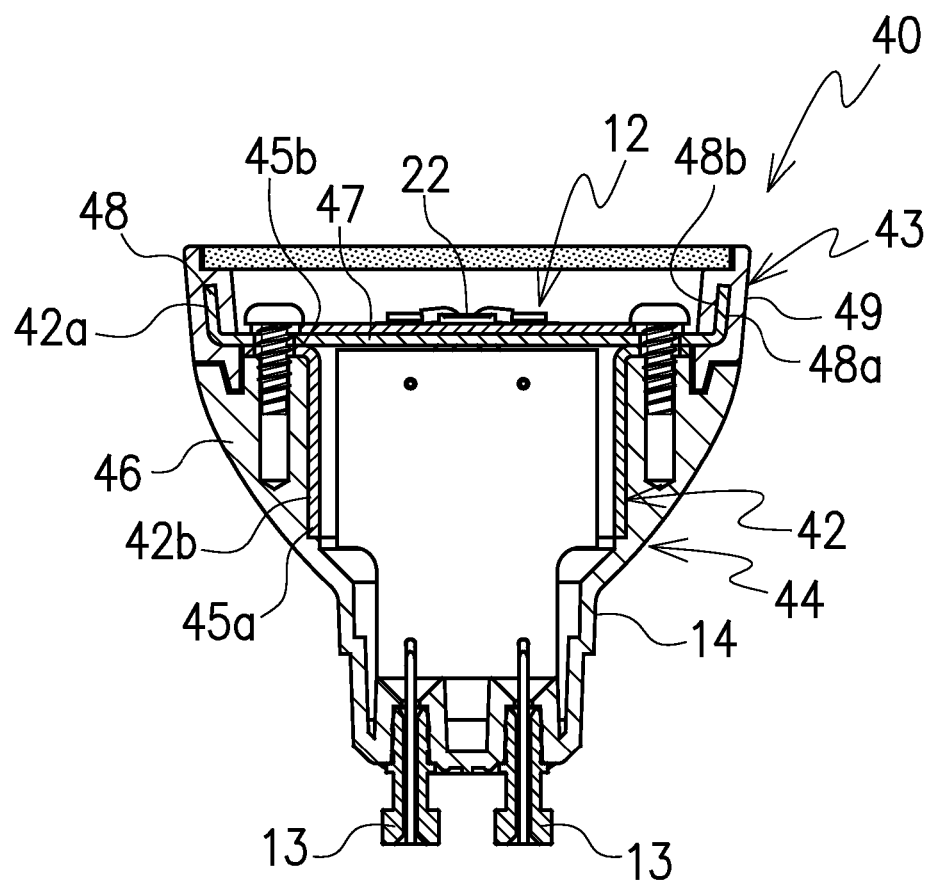
FIG. 9 is a sectional view of a lighting device according to a third embodiment of the present invention.
Figure 10:
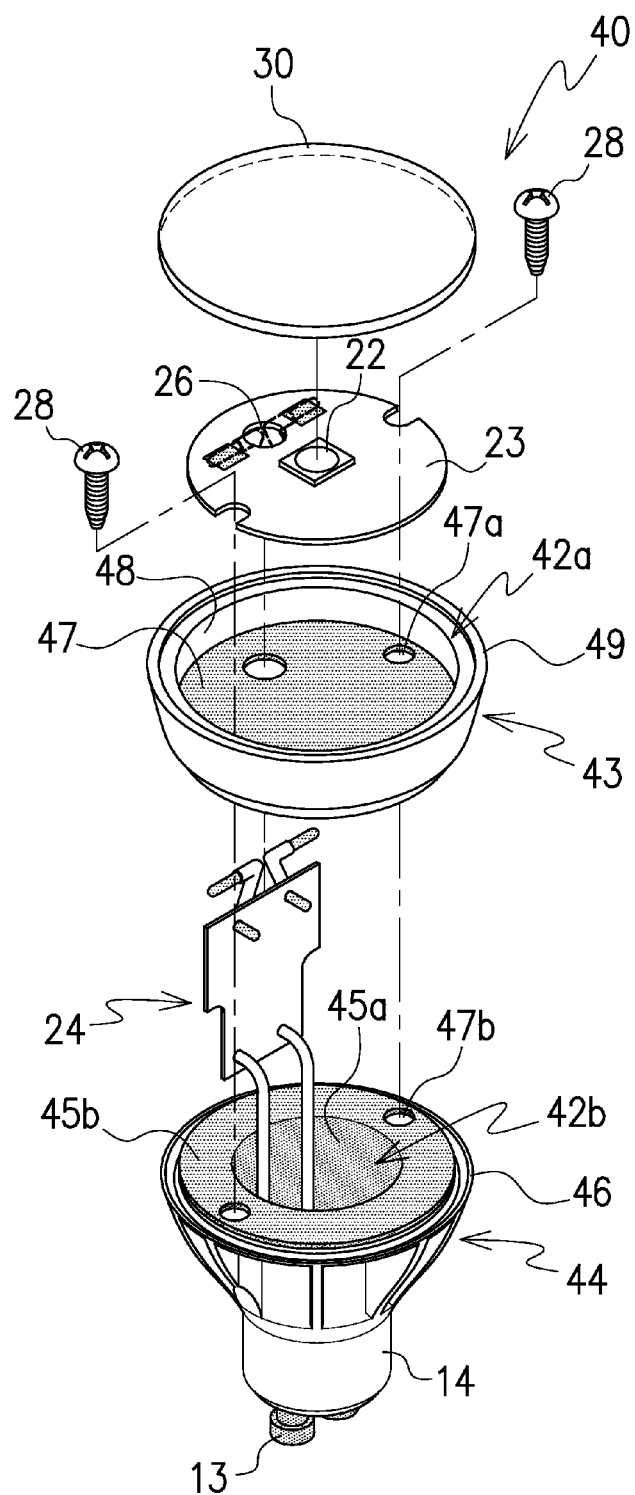
FIG. 10 is an exploded perspective view of the lighting device according to the third embodiment.

FIGS. 9 and 10 show a lighting device 40 according to a third embodiment of the present invention. In this embodiment, a holder is divided into a first holder section and a second holder section. Accordingly, a heat conductor 42 is also divided in a first heat conductor section and a second heat conductor section. The first heat conductor section 42a includes a circular plate 47 on which the substrate 23 is mounted, and a flange 48 surrounding an outer peripheral portion of the circular plate 47 and including an outer peripheral surface and an inner peripheral surface that are covered by an upper portion of an insulation layer 49 to constitute a first holder section 43. Also, a second heat conductor section 42b includes a cylindrical portion 45a demarcating a space in which the drive circuit 24 is arranged and an annular-shaped stepped portion 45b provided on an upper end of the cylindrical portion 45a, and an outer peripheral surface of the cylindrical portion 45a and the stepped portion 45b are covered by a lower portion of the insulation layer 46 to constitute a second holder section 44. The second holder 44 includes a lower end that is integrated with a base portion 14 including a pair of electrical contacts projecting therefrom.

Similar to the first embodiment, at the first holder section 43, an outer peripheral surface 48a and inner peripheral surface 48b of flange 48 of the heat conductor 42 are covered by an insulation layer to constitute an upper portion 49 of the insulation layer, by insert molding of resin at the first heat conductor section 42a of the heat conductor 42. Also, at the second holder section 44, the second heat conductor section 42b is positioned at a lower portion of the heat conductor 42, and an outer peripheral surface of a cylindrical portion that is the second heat conductor section 42b and an outer peripheral surface of a stepped portion 45b that is to be adjacent to the first heat conductor section 42a are covered by an insulation layer to constitute a lower portion of insulation layer 46. The circular plate 47 of the first holder section 43 and the stepped portion 45b of the second holder section 44 can be adhered by an adhesion, for example, and common holes 47a, 47b can be screwed by oval head screw to be assembled as a holder. Furthermore, a projection and concave pattern can be provided at an outer peripheral surface of the second holder 44, and the second heat conductor section 42b of the heat conductor 42 corresponding to the cylindrical portion 45a can have an undulating configuration and also can have heat-releasing fins.

In the lighting device 40 according to the third embodiment, heat generated in the light source 22 can be released through the circular plate 47 of the first holder section 43 that is an upper portion of the holder to the first heat conductor section 42a, and released through the stepped portion 45b of the second holder 44 that is a lower portion of the holder to the second heat conductor section 42b. Accordingly, a heat releasing effect in this embodiment can be achieved, similarly to the first and second embodiments.

Figure 11:
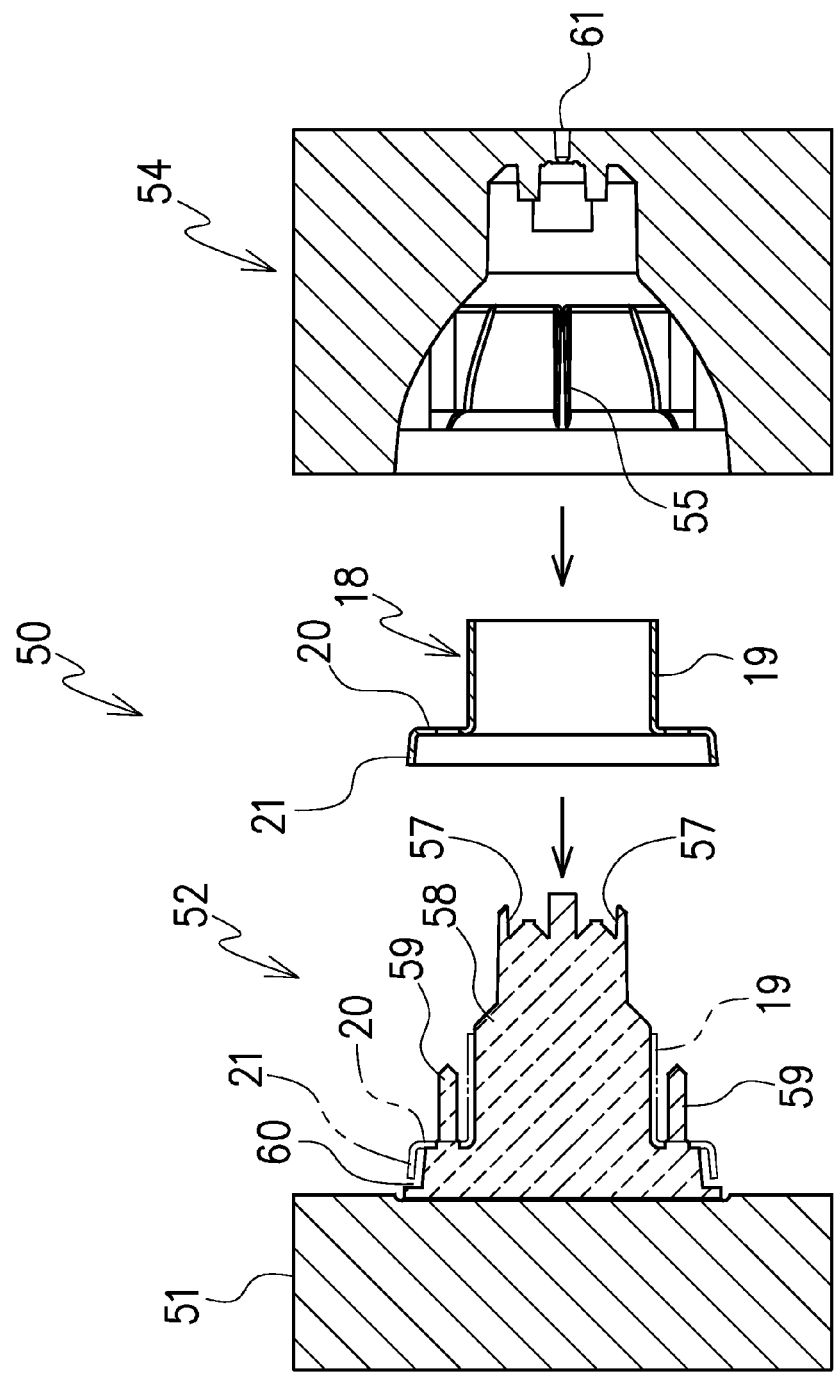
FIG. 11 is a sectional view showing a die to form a holder.

Next, a method of manufacturing a holder 15 in a lighting device 10 according to the first embodiment is explained with reference to FIGS. 11 to 13. FIG. 11 shows a configuration of die 50 for insert molding. The die 50 includes a molding die (core) 52 to shape the holder 15, and a molding die (cavity) 54 to form an insulation layer and a thermoplastic resin 56 to be injected to cover the core 52 with the heat conductor 18 arranged on the core 52.

The core 52 is prepared to fit to an outer shape of the base portion 14 and the heat conductor 18 as shown in FIG. 1, and fixed to a fixed stage 51 by placing an upper surface of the core on the fixed base. As shown in FIG. 11, the core 52 includes a concave portion 57 that is to be a base portion 14 of the holder 15, and in that a pair of electrical contacts 13 are to be inserted. In addition, the core includes a body portion 58 on which the heat conductor 18 made of metallic material and able to be formed by a press working is arranged and screw-hole portions 59. A gap 60 to be filled with a resin 56 over the upper end of the flange to the inner peripheral surface of the flange 21 of the heat conductor 18 arranged on the core is provided at an upper portion of the core 52.

The cavity 54 includes a space for a thickness of insulation layer 16 covering an outer peripheral portion of the core 52 and may include a gate 61 to inject the resin 56 from an exterior with a nozzle (not shown) being provided at a portion corresponding to a lower end of the base portion 14. Furthermore, if the heat conductor 18 includes an undulating surface at an outer peripheral surface of the heat conductor as shown in FIG. 7 and if the heat conductor 18 includes heat-releasing fins as shown in FIG. 8, the molding die (cavity) 54 may include an inner configuration 55 of projections and concavities that correspond to the outer peripheral surface of the heat conductor.

Figure 12:
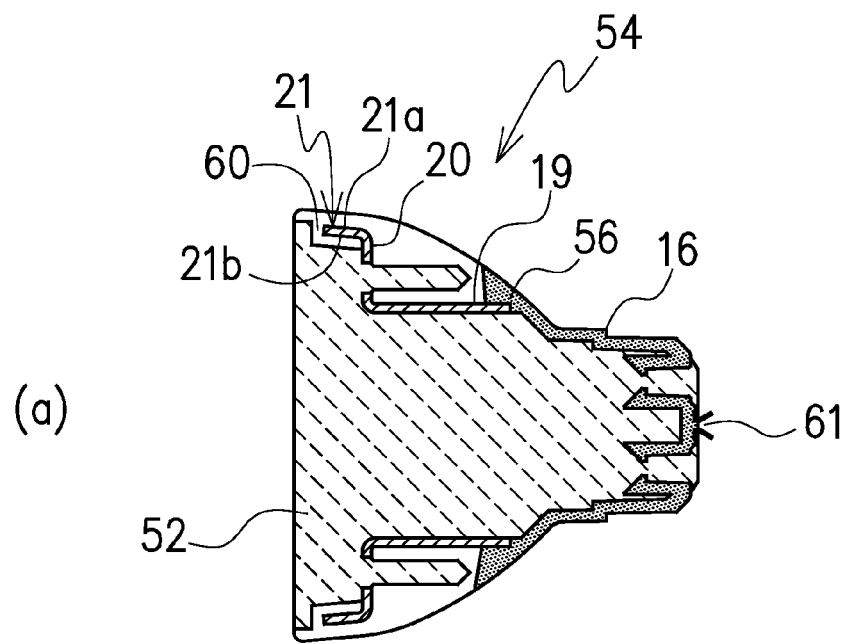
FIGS. 12(a) and 12(b) are explanatory views showing a process to inject a resin in the die.
Figure 12:
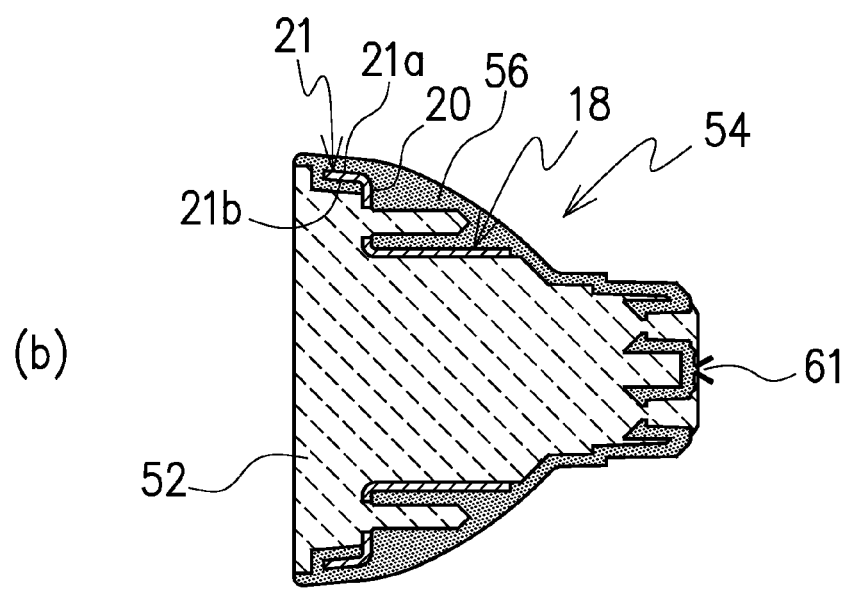

FIG. 12 shows a process to inject the resin 56 in the die 50 to cover the outer peripheral surface of the heat conductor 18 with the insulation layer 16 by the insert molding. The resin 56 injected from the gate 61 of the cavity 54 forms the portion corresponding to the base portion 14 to cover the lower portion of the core 52, and injected with pressure along the outer peripheral surface of the heat conductor 18 (FIG. 12(a)). Since the heat conductor 18 is pressed forward by the injection pressure of resin at this process, the stepped portion 20 of the heat conductor 18 is pressed against the core 52 to be tightly in contact with the core 52. The injected resin 56 injected with pressure is flowed to cover the outer peripheral surface of the heat conductor 18, the outer peripheral surface of the stepped portion 20 of the heat conductor 18, and the outer peripheral surface 21a of the flange 21, and further flowed to pass over a top portion of the flange and flowed to reach the inner peripheral surface of the flange with the gap 60 at a top portion of the core 52 filled by the resin. The resin is flowed to cover down to the inner peripheral surface 21b of the flange 21 (FIG. 12(b)). At this time, because the stepped portion 20 is tightly in contact with the core 52, the resin 56 is not flowed to an upper surface the stepped portion 20, and thus, burr-resistant.

Figure 13:
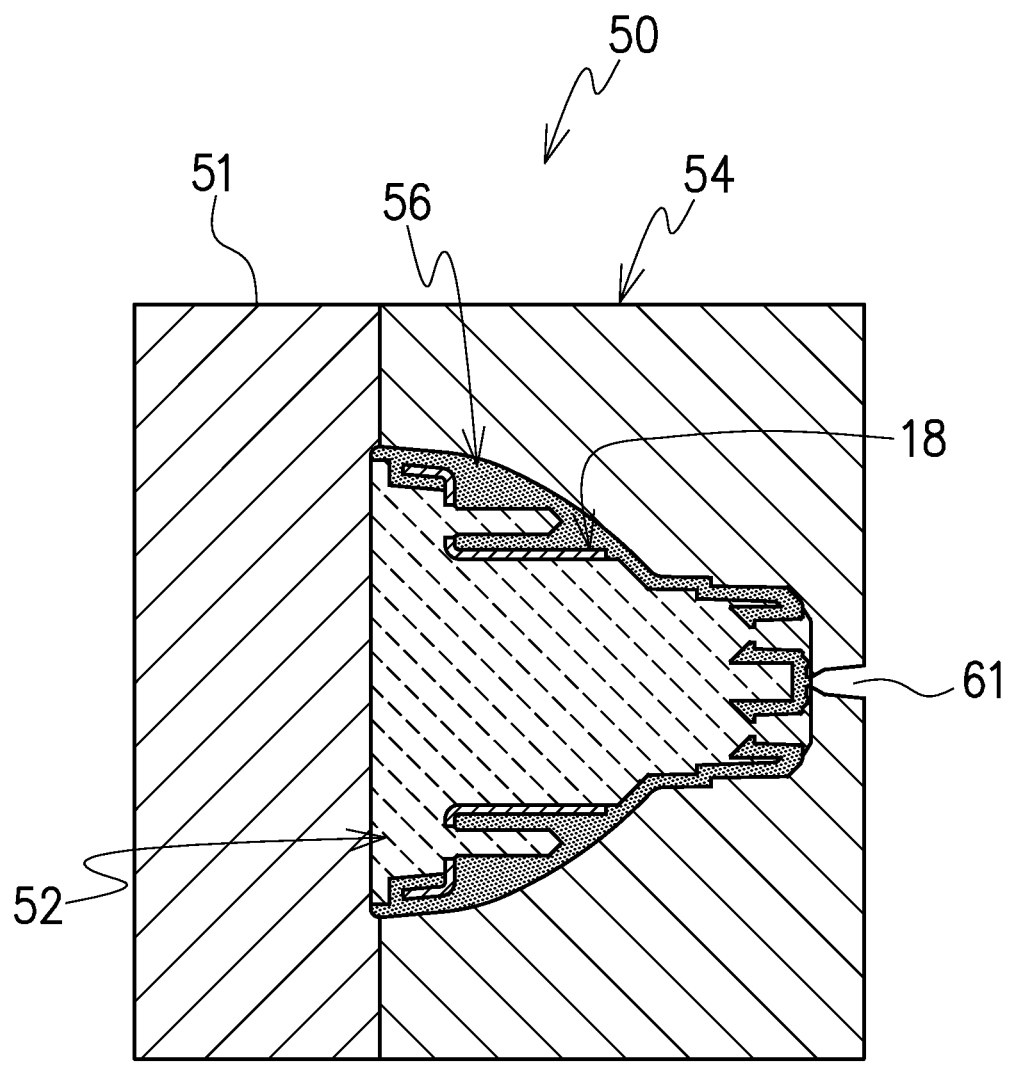
FIG. 13 is a sectional view of the die filled with a resin.

FIG. 13 shows a state where a space between the core 52 and the cavity 54 of the die 50 is filled with the resin 56. After the filled resin 56 is hardened, the filled resin 56 will be taken off to provide a holder 15 with the outer peripheral surface of the heat conductor 19 covered by the insulation layer 16. Then, as shown in FIG. 2, a part of the module 12 and the electrode pins 17 are arranged in the space 11 of the holder 15. Finally, the lens 30 is arranged on a lens holding portion 27 that includes a shape of step at the upper end of the holder 15 above the module 12 to cover the light source 22 to provide the lighting device 10.

According to the above-mentioned manufacturing method, when the insulation layer 16 is integrally formed on the outer peripheral surface of the heat conductor 18 by the insert molding, the thermoplastic resin 56 is injected from an approximately central portion adjacent to a bottom of the core 52 that is to be the base portion 14, toward an upper portion of the heat conductor 18. As previously mentioned, the insulation layer 16 is formed with the heat conductor 18 pressed against the core 52. Consequently, it is possible to prevent an extra resin from excessively flowing between the core 52 and the upper end portion of the heat conductor 18. The stepped portion 20 of the heat conductor 18 can be burr-resistant, and thus, an unnecessary process to remove a burr can be omitted before arranging the substrate 23 with the light source on the stepped portion.

DESCRIPTION OF REFERENCE NUMBERS 10 lighting device
11 space
12 module
13 electrical contacts
14 base portion
15 holder
16 insulation layer
17 electrode pin
18 heat conductor
19 cylindrical portion of heat conductor
20 stepped portion of heat conductor
21 flange of heat conductor
21a outer peripheral surface of flange
21b inner peripheral surface of flange
22 light source
23 substrate on that light source is mounted
24 drive circuit
25 lead wires
26 hole for electrical connection
27 lens holding portion
28 oval head screw
28a U-shaped notch
28b fixing hole provided in stepped portion of heat conductor
28c screw hole provided in insulation layer
29 board for drive circuit
30 lens
31 fin
32 heat-releasing fin
33 lighting device
34 module
35 substrate on that light source is mounted
36 heat-conducting plate
37 drive circuit
38 connector
39 hole
40 lighting device
42 heat conductor
42a first heat conductor section
42b second heat conductor section
43 first holder section
44 second holder section
45a cylindrical portion of heat conductor
45b stepped portion of heat conductor
46 lower portion of insulation layer
47 circular plate
47a, 47b holes to receive screw
48 flange of heat conductor
48a outer peripheral surface of flange
48b inner peripheral surface of flange
49 upper portion of insulation layer
50 die
51 fixed stage
52 core
54 cavity
55 projection and concave configuration
56 resin
57 concave portion
58 body portion
59 screw-hole portion
60 gap
61 gate

The invention claimed is:

1. A lighting device, comprising:
a module comprising a substrate and a light source that comprises at least one light-emitting diode element and that is mounted on the substrate; and
a holder comprising a heat conductor that is thermally connected to the at least one light-emitting diode element of the light source, and comprising an insulation layer, wherein
the heat conductor comprises an annular and flat stepped portion to support the substrate of the module, and comprises a flange that extends toward a front of the lighting device from an outer peripheral edge of the annular and flat stepped portion,
the insulation layer covers an outer peripheral surface of the heat conductor, the insulation layer extending from the outer peripheral surface, passing over an upper portion of the flange toward the front of the lighting device, and extending to an inner peripheral surface of the flange, and
the insulating layer comprises a stepped portion at an upper end toward the front of the lighting device, the stepped portion for holding a lens that is arranged to cover the light source of the module.

2. The lighting device according to claim 1, wherein the insulation layer covers at least a part of the inner peripheral surface of the flange.

3. The lighting device according to claim 1, wherein the holder comprises a body portion having a space therein, the space being demarcated by the heat conductor that extends from an inner peripheral edge of the annular and flat stepped portion under the substrate of the module toward a rear of the lighting device, and
the module further comprises a drive circuit that is arranged in the space of the holder and that is configured to drive the at least one light-emitting diode element of the light source.

4. The lighting device according to claim 3, further comprising:
   a base portion comprising a pair of electrical contacts that are electrically connected to the drive circuit, and disposed at a lower end of the holder toward the rear of the lighting device.

5. The lighting device according to claim 3, wherein
   the flange has an annular shape,
   the inner peripheral edge of the annular and flat stepped portion is annular,
   the heat conductor further comprises a cylindrical portion that is positioned inside the body portion of the holder and extends from the annular inner peripheral edge of the annular and flat stepped portion toward a position under the substrate of the module toward the rear of the lighting device, and the insulation layer covers at least an outer peripheral surface of each of the annular and flat stepped portion, the annular flange and the cylindrical portion of the heat conductor.

6. The lighting device according to claim 1, wherein
   the insulation layer is integrated with the outer peripheral surface of the heat conductor.

7. The lighting device according to claim 1, wherein
   the insulation layer comprises multi-layers formed on the outer peripheral surface of the heat conductor.

8. The lighting device according to claim 1, wherein
   the heat conductor comprises at least one heat-releasing fin that extends from the outer peripheral surface of the heat conductor toward an outside of the heat conductor.

9. The lighting device according to claim 1, further comprising:
   a lens covering the light source that is mounted on the substrate.

10. The lighting device according to claim 1, wherein
    the heat conductor is made of a metal.

11. The lighting device according to claim 10, wherein
    the heat conductor comprises at least one metal among of aluminum, iron, and brass.

12. The lighting device according to claim 1, wherein
    the insulation layer is made of a resin.

13. The lighting device according to claim 11, wherein
    the insulation layer comprises at least one resin of polybutylene terephthalate resin and polycarbonate resin.

14. The lighting device according to claim 1, further comprising:
    a circular heat-conducting plate disposed between a lower surface of the substrate on which the light source is mounted and the annular and flat stepped portion of the heat conductor.

15. A lighting device, comprising:
    a module comprising a substrate and a light source that comprises at least one light-emitting diode element and that is mounted on the substrate; and
    a holder comprising a heat conductor that is thermally connected to the at least one light-emitting diode element of the light source and comprising an insulation layer,
    the heat conductor comprising an annular stepped portion provided on an upper portion of the holder toward a front of the lighting device, an annular flange that extends toward the front of the lighting device from an annular outer peripheral edge of the annular stepped portion and a cylindrical portion that extends from an annular inner peripheral edge of the annular stepped portion under the substrate toward a rear of the lighting device,
    the insulation layer covering an outer peripheral surface of the heat conductor, the insulation layer passing over an upper portion of the flange toward the front of the lighting device and extending to an inner peripheral surface of the flange,
    the insulation layer comprises a stepped portion at an upper end toward the front of the lighting device, and
    the substrate on which the light source of the module is mounted is supported on the annular stepped portion of the heat conductor.

16. The lighting device according to claim 15, further comprising:
    a drive circuit comprising a board, the drive circuit being configured to drive the at least one light-emitting diode element of the light source,
    wherein the heat conductor includes a space in the cylindrical portion under the substrate on which the light source of the module is mounted, and at least the board of the drive circuit is contained in the space in the cylindrical portion of the heat conductor.

17. A method for manufacturing a holder of a lighting device, the method comprising:
    disposing a heat conductor comprising a stepped portion and a flange that extends toward a front of the lighting device from a peripheral edge of the stepped portion in a die;
    injecting a resin between an inner surface of the die and an outer peripheral surface of the heat conductor to form an insulation layer integrated on the outer peripheral surface of the heat conductor; and
    pressing the stepped portion of the heat conductor against the die by an injection pressure to flow the resin to pass over a top portion of the flange of the heat conductor toward the front of the lighting device and to reach an inner peripheral surface of the flange when injecting the resin between the inner surface of the die and the outer peripheral surface of the heat conductor.

* * * * *